United States Patent
Hong et al.

(10) Patent No.: US 12,330,191 B2
(45) Date of Patent: Jun. 17, 2025

(54) ALIEN SUBSTANCE REMOVING APPARATUS AND ELECTRICAL STEEL SHEET MANUFACTURING FACILITY HAVING THEREOF

(71) Applicant: POSCO, Pohang-si (KR)

(72) Inventors: Seong-Cheol Hong, Pohang-si (KR);
Ki-Young Min, Pohang-si (KR);
Se-Min Park, Pohang-si (KR);
Dong-Geun Kim, Pohang-si (KR);
Oho-Cheal Kwon, Pohang-si (KR);
Chang-Ho Kim, Pohang-si (KR);
Sang-Uk Ha, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 808 days.

(21) Appl. No.: 17/312,668

(22) PCT Filed: Dec. 11, 2019

(86) PCT No.: PCT/KR2019/017445
§ 371 (c)(1),
(2) Date: Jun. 10, 2021

(87) PCT Pub. No.: WO2020/122575
PCT Pub. Date: Jun. 18, 2020

(65) Prior Publication Data
US 2022/0048136 A1 Feb. 17, 2022

(30) Foreign Application Priority Data
Dec. 13, 2018 (KR) .......................... 10-2018-0160645

(51) Int. Cl.
*B08B 1/30* (2024.01)
*B08B 1/12* (2024.01)
(Continued)

(52) U.S. Cl.
CPC .................. *B08B 1/30* (2024.01); *B08B 1/12* (2024.01); *B08B 1/165* (2024.01); *B08B 15/02* (2013.01);
(Continued)

(58) Field of Classification Search
CPC ............. B08B 1/30; B08B 1/12; B08B 1/165; B08B 15/02; B23K 26/16; B23K 26/36;
(Continued)

(56) References Cited

U.S. PATENT DOCUMENTS 4,287,405 A 9/1981 Ohmae et al.
4,411,253 A * 10/1983 Devin ................... F24B 13/006
110/166

(Continued)

FOREIGN PATENT DOCUMENTS

CN 206083190 U 4/2017
CN 106809712 A 6/2017
(Continued)

OTHER PUBLICATIONS

Kumar, S. et al. "Screw-press briquetting machines and briquette-fired stoves." Technology Packages, May 2005, pp. 22-26. (Year: 2005).*
(Continued)

*Primary Examiner* — Keith D. Hendricks
*Assistant Examiner* — Moriah S. Smoot
(74) *Attorney, Agent, or Firm* — Morgan Lewis & Bockius LLP

(57) ABSTRACT

An alien substance removing apparatus according to one embodiment of the present invention may comprise: a hood unit provided adjacent to an electrical steel sheet and for collecting an alien substance generated in the electrical steel sheet by laser irradiation; and a scraping unit coupled to the hood unit and scraping and removing the alien substance attached to one surface of the hood unit facing the electrical steel sheet.

11 Claims, 7 Drawing Sheets

(51) Int. Cl.
  *B08B 1/16* (2024.01)
  *B08B 15/02* (2006.01)
  *B23K 26/16* (2006.01)
  *B23K 26/36* (2014.01)
  *B23K 26/364* (2014.01)
  *C21D 10/00* (2006.01)

(52) U.S. Cl.
  CPC .............. *B23K 26/16* (2013.01); *B23K 26/36* (2013.01); *B23K 26/364* (2015.10); *C21D 10/005* (2013.01)

(58) Field of Classification Search
  CPC .............. B23K 26/364; B23K 2101/16; B23K 2103/04; B23K 26/0838; C21D 10/005; C21D 8/12; C21D 8/1216; C21D 9/46; C21D 10/00
  See application file for complete search history.

(56) References Cited

U.S. PATENT DOCUMENTS

| | | | |
|---|---|---|---|
| 6,127,648 A | 10/2000 | Scott | |
| 2016/0136695 A1* | 5/2016 | Chalmers | B23K 37/0461 15/256.5 |
| 2017/0158463 A1 | 6/2017 | Jiang et al. | |

FOREIGN PATENT DOCUMENTS

| | | | | |
|---|---|---|---|---|
| CN | 207025915 U | | 2/2018 | |
| CN | 108032081 A | * | 5/2018 | ......... B23K 26/0093 |
| GB | 2277699 A | | 11/1994 | |
| JP | S60-044067 A | | 3/1985 | |
| JP | S63-107742 U | | 7/1988 | |
| KR | 20-0259109 Y1 | | 12/2001 | |
| KR | 101739870 B1 | * | 6/2003 | |
| KR | 20030049747 A | * | 6/2003 | |
| KR | 10-2004-0024271 A | | 3/2004 | |
| KR | 101693513 B1 | * | 1/2017 | |
| KR | 10-2018-0073276 A | | 7/2018 | |

OTHER PUBLICATIONS

International Search Report (with partial translation) and Written Opinion dated Mar. 23, 2020, issued in corresponding International Patent Application No. PCT/KR2019/017445.

Chinese Office Action dated Jun. 6, 2022 issued in Chinese Patent Application No. 201980082716.1.

Extended European Search Report dated Jan. 5, 2022 issued in European Patent Application No. 19896045.2.

* cited by examiner

[Figure 1]
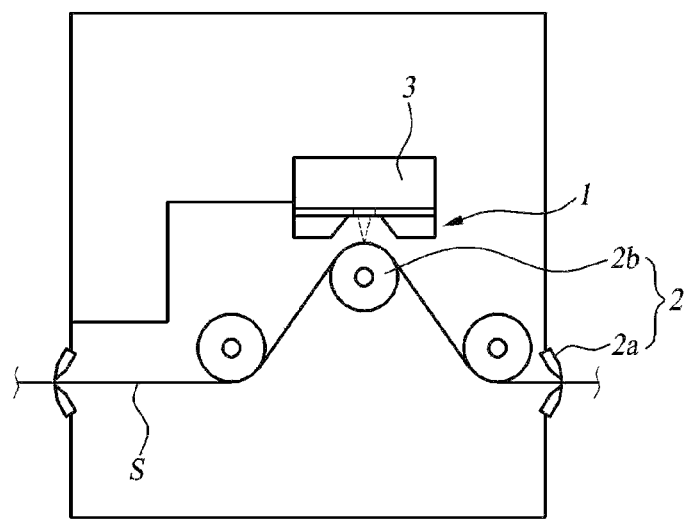

[Figure 2]
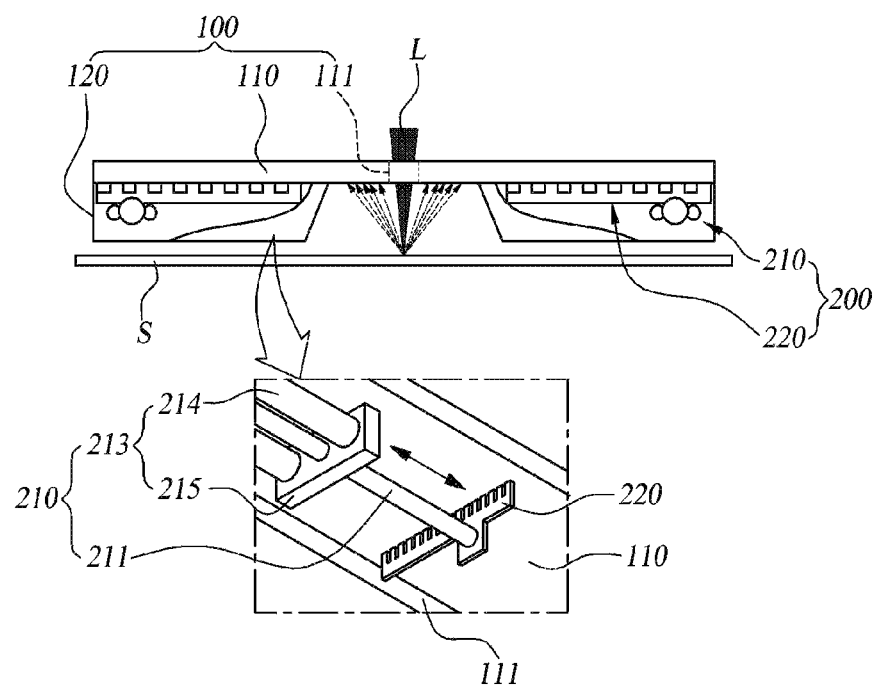

[Figure 3]
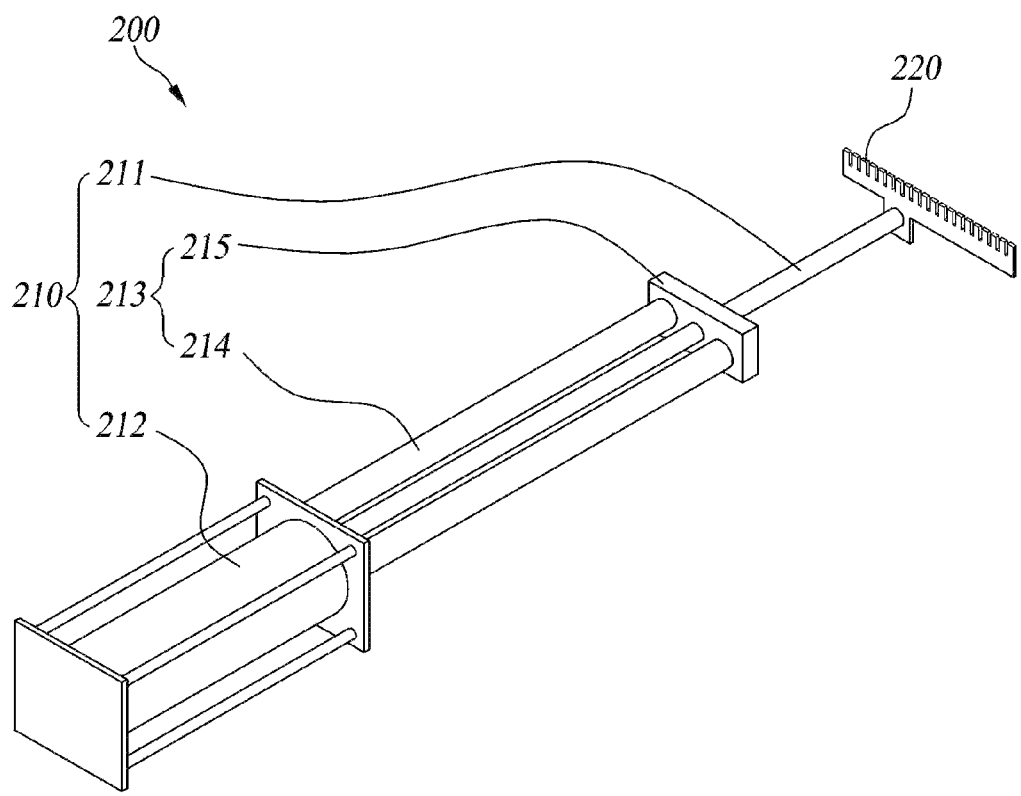

[Figure 4]
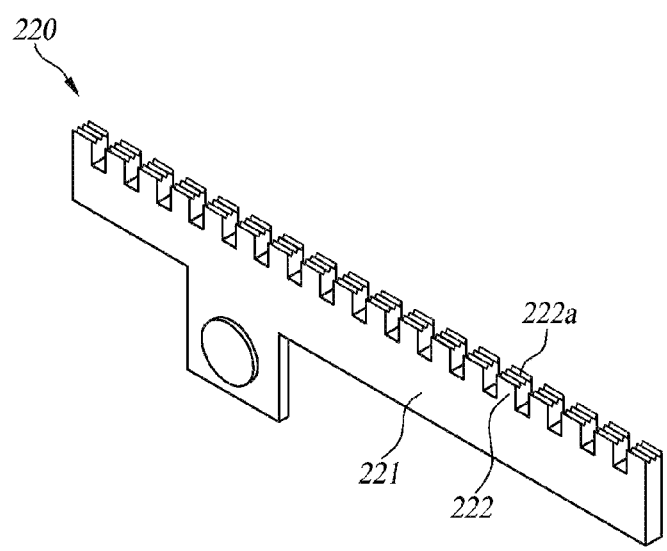

[Figure 5]
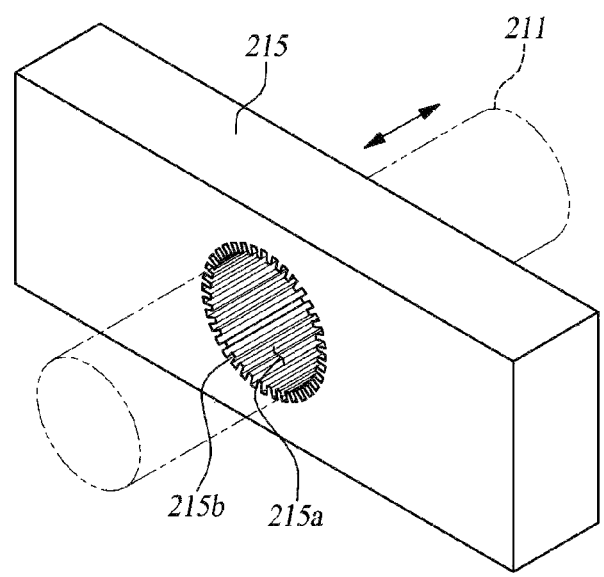

[Figure 6]
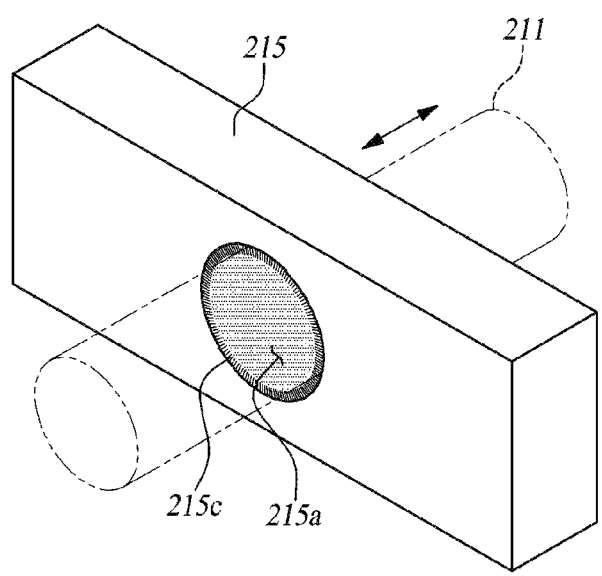

[Figure 7]
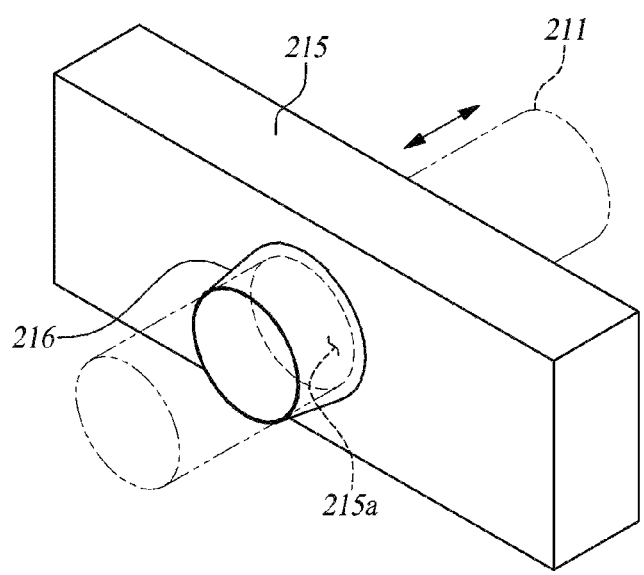

ALIEN SUBSTANCE REMOVING APPARATUS AND ELECTRICAL STEEL SHEET MANUFACTURING FACILITY HAVING THEREOF

CROSS-REFERENCE OF RELATED APPLICATIONS

This application is the U.S. National Phase under 35 U.S.C. § 371 of International Application No. PCT/KR2019/017445 filed on Dec. 11, 2019, which claims the benefit of Korean Application No. 10-2018-0160645 filed on Dec. 13, 2018, the entire contents of each are hereby incorporated by reference.

TECHNICAL FIELD

The present disclosure relates to a foreign object removing apparatus and an electrical steel sheet manufacturing facility having the same.

BACKGROUND ART

In order to reduce power loss and improve efficiency of electrical devices such as transformers, a grain-oriented electrical steel sheet having low iron loss and high magnetic flux density is required. To this end, there is a need for a magnetic domain refinement process improving iron loss by generating grooves by applying a high output continuous wave laser beam forming grooves in the surface of the grain-oriented electrical steel sheet.

However, in this method for permanent magnetic domain refinement, a groove must be formed in the surface of the steel sheet, and in this case, various types of foreign objects such as particles, chips, spatters, fumes, and the like, are formed on the surface of the steel sheet.

These foreign objects must be removed immediately, and if the foreign objects are not removed immediately, there is a problem of contaminating surrounding facilities and deteriorating working environments.

In particular, the spatter has an approximately spherical shape, and a size having a diameter ranging from several hundreds nm to several tens of μm, and consists of Fe, Si, C, and O components. When an optical system transmitting a laser to the steel sheet by is contaminated the spatter, the performance thereof may be rapidly deteriorated, such that groove processing quality and productivity may not be secured.

In addition, after these spatters are fused to a surrounding facility and grown into a lump, the lump may fall onto the surface of the steel sheet, causing plate breakage, and it may be caught between rollers of a rear end facility, causing a problem of generating defects on the surface of the steel sheet.

Accordingly, there is a need for a research into a foreign object removing apparatus for improving the above-described problems or limitations, and an electrical steel sheet manufacturing facility including the same.

DISCLOSURE

Technical Problem

An aspect of the present disclosure is to provide a foreign object removing apparatus for removing foreign objects and an electrical steel sheet manufacturing facility including the same.

Another aspect of the present disclosure is to provide a foreign object removing apparatus for removing foreign objects attached to a scraping unit for removing foreign objects, and an electrical steel sheet manufacturing facility including the same.

Technical Solution

According to an aspect of the present disclosure, a foreign object removing apparatus may include: a hood unit provided adjacent to an electrical steel sheet, and for collecting a foreign object generated in the electrical steel sheet by laser irradiation; and a scraping unit coupled to the hood unit, and scraping and removing the foreign object attached to one surface of the hood unit facing the electrical steel sheet.

Specifically, the scraping unit of the foreign object removing apparatus according to an embodiment of the present disclosure may include an expansion and contraction driving unit coupled to one surface of the hood unit facing the electrical steel sheet; and a scraper unit coupled to an end portion of a rod member that is expanded and contracted in the expansion and contraction driving unit, and being in close contact with one surface of the hood unit to reciprocate.

Here, the scraper unit of the foreign object removing apparatus according to an embodiment of the present disclosure may be biasedly coupled to an end portion of the rod member that is expanded and contracted in the expansion and contraction driving unit coupled to a position biased on one side of one surface of the hood unit.

The scraper unit of the foreign object removing apparatus according to an embodiment of the present disclosure may include a scraper body coupled to the rod member, and a contact tab unit provided on the scraper body and formed to protrude to contact one surface of the hood unit, the plurality of contact tab units being formed to be spaced apart from each other at a predetermined interval.

Here, in the contact tab unit of the foreign object removing apparatus according to an embodiment of the present disclosure, unevenness portions, parallel to a direction intersecting an expansion and contraction direction of the rod member are formed on a contact surface, in contact with one surface of the hood unit.

The expansion and contraction driving unit of the foreign object removing apparatus may include a driving cylinder fixedly coupled to one surface of the hood unit and to which the rod member is connected in an expansion and contraction manner, and a rod cleaner that is connected to pass through the rod member to remove foreign objects attached to the rod member.

Here, the rod cleaner of the foreign object removing apparatus according to an embodiment of the present disclosure may include a pair of support bar members having one end portion coupled to the driving cylinder, and disposed adjacent to both sides of the rod member, and a support block member coupled to the other end portion of the pair of support bar members and having a through-hole through which the rod member reciprocates.

In the support block member of the foreign object removing apparatus according to an embodiment of the present disclosure, a toothed portion, in contact with the rod member, is formed on an inner surface of the through-hole.

In addition, in the support block member of the foreign object removing apparatus of the present disclosure, a brush, in contact with the rod member, is formed on an inner surface of the through-hole. The rod cleaner of the foreign object removing apparatus according to an embodiment of the present disclosure may include a scrub member having one end portion coupled to the support block member portion, adjacent to the through-hole, and the other end portion provided in a form of a trumpet, in contact with the rod member.

In addition, the hood unit of the foreign object removing apparatus according to an embodiment of the present disclosure may include a cooling block member disposed on the electrical steel sheet, having a slit hole through which the irradiated a laser passes, having a cooling passage through which a cooling fluid flows, wherein the scraping unit is coupled to one surface facing the electrical steel sheet; and a dust collecting member coupled to the cooling block member to surround the cooling block member, and collecting foreign objects generated from the electrical steel sheet.

An electrical steel sheet manufacturing facility according to another embodiment of the present disclosure may include a laser room provided on a moving path of an electrical steel sheet; a laser device provided inside the laser room, and forming a groove on a surface of the electrical steel sheet by irradiating a laser; and the foreign object removing apparatus provided inside the laser room, and disposed between the electrical steel sheet and the laser device.

Advantageous Effects

The foreign object removing apparatus and an electrical steel sheet manufacturing facility including the same of the present disclosure have an advantage of removing foreign objects. Thereby, it is possible to have an effect of preventing a problem that occurs when foreign objects such as spatter, or the like generated by laser irradiation are fused to a surrounding configuration and fall after growth.

In another aspect, the foreign object removing apparatus of the present disclosure and the electrical steel sheet including the same have an advantage for removing an foreign object attached to the scraping unit for removing foreign objects. Thereby, it may have an effect for increasing a life of the scraping unit.

However, various and beneficial advantages and effects of the present disclosure are not limited to the above-described contents, and may be more easily understood in the course of describing specific embodiments of the present disclosure.

DESCRIPTION OF DRAWINGS

FIG. 1 is a block diagram illustrating a foreign object removing apparatus of the present disclosure and an electrical steel sheet manufacturing facility including the same.

FIG. 2 is a front view illustrating a foreign object removing apparatus of the present disclosure.

FIG. 3 is a perspective view illustrating a scraping unit of the foreign object removing apparatus of the present disclosure.

FIG. 4 is a perspective view illustrating a scraper unit in the scraping unit of the foreign object removing apparatus of the present disclosure.

FIG. 5 is a perspective view illustrating an embodiment in which a support block member includes a toothed portion in the scraping unit of the foreign object removing apparatus of the present disclosure.

FIG. 6 is a perspective view illustrating an embodiment in which a support block member includes a brush in the scraping unit of the foreign object removing apparatus of the present disclosure.

FIG. 7 is a perspective view illustrating an embodiment in which the scraping unit of the foreign object removing apparatus of the present disclosure includes a scrub member.

BEST MODE FOR INVENTION

Hereinafter, exemplary embodiments of the present disclosure will be described in detail with reference to the accompanying drawings. In the following description, when describing the embodiments in detail, only embodiments necessary for understanding of functions and configuration according to embodiments in the present disclosure will be described and other embodiments may be omitted, so as not to obscure the subject matter of the present disclosure.

In addition, the same reference numerals will be used throughout the drawings for elements having the same or similar functions and operations.

The present disclosure relates to a foreign object removing apparatus 1 and an electrical steel sheet manufacturing facility including the same, and it is possible to remove an foreign object, whereby, a problem generated when the foreign object such as a spatter, or the like, generated by laser (L) irradiation is fused to a surrounding component and falls after growth, may be prevented, and in other aspect, the foreign object attached to a scraping unit 200 for removing foreign objects may also be removed, thereby increasing a life of the scraping unit 200.

Specifically, referring to the drawings, FIG. 1 is a block diagram illustrating a foreign object removing apparatus 1 and an electrical steel sheet manufacturing facility including the same. Referring to FIG. 1, the foreign object removing apparatus 1 according to an embodiment of the present disclosure may include a hood unit 100 provided adjacent to an electrical steel sheet S, and for collecting an foreign object generated in the electrical steel sheet S by laser irradiation; and a scraping unit coupled to the hood unit 100, and scraping and removing the foreign object attached to one surface of the hood unit 100 facing the electrical steel sheet S.

As described above, by including the scraping unit 200, the foreign object removing apparatus 1 of the present disclosure may separate an foreign object generated when irradiated with a laser such as a spatter, or the like, attached to the hood unit 100, such that a problem in which foreign objects cause defects in the electrical steel sheet S due to the fall after growth of the spatter, or the like, may be prevented.

In other words, when the scraping unit 200 does not remove the spatter attached to the hood unit 100 and falls by its own weight due to growth of the spatter, it is not collected by the hood unit 100 and affects the electrical steel sheet S, but when the spatter attached to the hood unit 100 is separated by the scraping unit 200, spatter particles can be sucked and treated by the hood unit 100, so that it does not cause a problem of causing defects in the electrical steel sheet S.

Here, when a groove is formed on a surface of the electrical steel sheet S for permanent magnetic refinement, various types of foreign objects such as a chip, a spatter, a fume, or the like, formed by laser (L) irradiation, are formed, the hood unit 100 serves to collect these foreign objects and discharge them to a purification device.

To this end, the hood unit 100 may be installed in a region to which laser L is irradiated by a laser (L) device, or the like, among a moving path of the electrical steel sheet S, and may be provided to partially surround the steel sheet S.

More specifically, the hood unit 100 may include a cooling block member 110 for preventing damage to the laser (L) device, and the like by irradiation of the laser (L), and for thermal shielding, and also include a dust collecting member 120 provided to surround the electrical steel sheet S to secure a region for collecting foreign objects such as a spatter, or the like, and a detailed description thereof will be described later with reference to FIG. 2.

The scraping unit 200 serves to remove a spatter generated when a groove is formed on the electrical steel sheet S by laser (L) irradiation is attached to the hood unit 100. To this end, the scrapping unit 200 may be configured to remove the spatter by scratching the surface of the hood unit 100 to which the spatter is attached.

Specifically, the scraping unit 200 may include an expansion and contraction driving unit 210 providing driving force that reciprocates on a surface of the electrical steel sheet S, and a scrapper unit 220 coupled to the expansion and contraction driving unit 210, and in contact with the hood unit 100 to remove a spatter attached to the hood unit 100, and a detailed description thereof will be described later with reference to FIG. 2.

An electrical steel sheet manufacturing facility according to another embodiment of the present disclosure may include a laser room 2, which may be a space in which the laser (L) device 3 is located, provided on a moving path of the electrical steel sheet S, a laser (L) device 3 provided inside the laser room 2, and forming a groove on a surface of the electrical steel sheet S by irradiating a laser L, and the foreign object removing apparatus 1 provided inside the laser room 2, and disposed between the electrical steel sheet S and the laser (L) device 3.

As described above, the electrical steel sheet manufacturing facility of the present disclosure includes the laser (L) device 3, in order to produce a magnetic domain refinement product by forming a groove in the grain-oriented electrical steel sheet S, and the above-described foreign object removing apparatus 1 removing spatter before growth by attaching spatter, or the like generated during forming a groove by the laser (L) device 3 to the hood unit 100.

Here, the laser room 2 is provided with the laser (L) device 3, the hood unit 100 is coupled to the laser (L) device 3, a cooling block member 110 of the hood unit 100 may block heat generated from the electrical steel sheet from being transferred to the laser room 2, and a dust collecting member 120 of the hood unit 100 may be provided to block foreign objects such as spatter, or the like, formed from the electrical steel sheet S from flowing into the laser (L) device 3.

Then, the electrical steel sheet (S) is transferred to the laser room 2. In addition, in the laser room 2, air curtains 2a may be formed at an inlet and an outlet of the electrical steel sheet S for sealing with an outside, and a roller 2b for supporting the movement of the electrical steel sheet S may be provided.

The laser (L) device 3 is configured to irradiate laser L to form a groove in the electrical steel sheet S. For example, the laser (L) device 3 is composed of an on-off control system, a laser (L) oscillator, and an optical system, and the on-off control system enables the oscillator to be turned-on under normal working conditions, and enables the oscillator to be automatically turned-off according to an amount of steel sheet meandering.

FIG. 2 is a front view illustrating an foreign object removing apparatus 1 of the present disclosure, and referring to the drawing, the scraping unit 200 of the foreign object removing apparatus 1 according to an embodiment of the present disclosure may include an expansion and contraction driving unit 210 coupled to one surface of the hood unit 100 facing the electrical steel sheet S, and a scraper unit 220 coupled to an end portion of the rod member 211 that is expanded and contracted in the expansion and contraction driving unit 210 and in close contact with one surface of the hood unit 100 and reciprocating.

That is, if a spatter generated when a groove is formed by laser (L) irradiation on the electrical steel sheet S is attached to the hood unit 100, in order to remove the spatter, the scraping unit 200 may include the expansion and contraction driving unit 210 and the scraper unit 220 as a specific configuration for removing the spatter by scratching the surface of the hood unit 100 to which the spatter is attached.

The expansion and contraction driving unit 210 serves to provide driving force for the scraper unit 220 to reciprocate on the surface of the hood unit 100.

To this end, the expansion and contraction driving unit 210 may be provided as an actuator that reciprocates, and may include, for example, a driving cylinder 212 of a hydraulic or pneumatic cylinder.

Here, the expansion and contraction driving unit 210 has one end portion fixedly coupled to the hood unit 100, and the other end portion that is expanded and contracted coupled to the scraper unit 220, thereby reciprocating the scraper unit 22

The expansion and contraction driving unit 210 may further include a rod cleaner 213 to remove spatter attached to the expansion and contraction rod member 211, which will be described later with reference to FIG. 3.

The scraper unit 220 directly contacts the hood unit 100 to serve to remove foreign objects such as spatter attached to the hood unit 100. To this end, the scraper unit 220 may be coupled to rod member 211 that is expanded and contracted in the expansion and contraction driving unit 210.

The scraper unit 220 may include a contact tab portion 222 to increase adhesion to the hood unit 100 in order to more efficiently remove the spatter, and a detailed description thereof will be described later with reference to FIG. 3.

In order to minimize the occurrence of a problem in which the spatter is attached by exposure of the rod member 211 to which the scraper unit 220 is coupled to the environment in which the spatter is formed, the scraper unit 220 may be coupled to be biased to the rod member 211.

That is, while disposing the rod member 211 as far away from the slit hole 111 formed in the cooling block member 110 of the hood unit 100, which is a laser (L) irradiation region where the spatter is intensively formed, so that a scraping operation by the scraper unit 220 is performed in a wider region of the cooling block member 110 of the hood unit 100, in order that the rod member 211 is disposed away from the slit hole 111 and the scraper unit 220 is evenly disposed to the cooling block member 110, the scraper unit 220 is disposed to be biased to the rod member 211.

In other words, the scraper unit 220 of the foreign object removing apparatus 1 according to an embodiment of the present disclosure is biasedly coupled to an end portion of the rod member 211 of the expansion and contraction driving unit 210 that is expanded and contracted, coupled to a position biased to one side of the hood unit 100, to be evenly disposed on one surface of the hood unit 100 to reciprocate.

The expansion and contraction driving unit 210 is provided with a pair on both sides of the slit hole 111 and provides driving force to remove a spatter, or the like, attached to the surface of the cooling block member 110 on both sides of the slit hole 111.

In addition, the hood unit 100 of the foreign object removing apparatus 1 according to an embodiment of the present disclosure may include a cooling block member 110 disposed on the electrical steel sheet S, having a slit hole 111 through which the irradiated laser L passes, having a cooling passage through which a cooling fluid flows, and to which the scraping unit 200 is coupled to one surface facing the electrical steel sheet S; and a dust collect member 120 coupled to surround the cooling block member 110, and collecting an foreign object generated from the electrical steel sheet S.

As described above, when the hood unit 100 forms a groove on the surface of the electrical steel sheet S for permanent magnetic domain refinement, the hood unit 100 may include a cooling block member 110 preventing damage to the laser (L) device by various types of foreign objects such as a chip, a spatter, a fume, or the like, formed by laser (L) irradiation and for thermal shielding, and a dust collecting member 120 provided to surround the electrical steel sheet S to which the laser L is irradiated to secure a collecting region for foreign object such as spatter, or the like.

In other words, the cooling block member 110 is a configuration for thermal protection for the laser (L) device 3, and a cooling passage through which a cooling fluid flows may be formed, and may be disposed between one surface of the electrical steel sheet S on which laser L is irradiated and the laser (L) device 3.

The dust collecting member 120 may be provided by being coupled to the cooling block member 110, and may be provided in a form surrounding one surface of the electrical steel sheet (S) to which the laser (L) is irradiated.

FIG. 3 is a perspective view illustrating a scraping unit 200 of the foreign object removing apparatus 1 of the present disclosure, and FIG. 4 is a perspective view illustrating a scraper unit 220 in the scraping unit 200 of the foreign object removing apparatus 1 of the present disclosure.

Referring to the drawings, the scraper unit 220 of the foreign object removing apparatus 1 according to an embodiment of the present disclosure may include a scraper body 221 coupled to the rod member 211, and a contact tab unit 222 provided in the scraper body 221, and formed to protrude to contact one surface of the hood unit 100, the plurality of contact tab portions being formed to be spaced apart at a predetermined interval.

As described above, since the scraper unit 220 is indirect contact with the hood unit 100 and serves to remove foreign objects such as spatter, or the like attached to the hood unit 100, the scraper unit 220 may be coupled to the rod member 211 that is expanded and contracted in the expansion and contraction driving unit 211, and in order to more efficiently remove the spatter, it may include a contact tab portion 222 to increase adhesion to the hood unit 100.

Here, the scraper body 221 is a configuration coupled to the rod member 211, and coupled to the rod member 211 to be biased. That is, since the expansion and contraction driving unit 210 is coupled adjacent to both side end portions of the cooling block member 110, which is a position to be biased around the slit hole 111 formed in the cooling block member 110 of the hood unit 100, in order for the scraper body 221 to be evenly disposed between the slit hole 111 and any one of both side end portions of the cooling block member 110, it should be coupled to the rod member 211 of the expansion and contraction driving unit 210 to be biased.

For example, when the expansion and contraction driving unit 210 is coupled to the cooling block member 110 to be biased to the left side, the scraper body 221 is combined to the rod member 211 of the expansion and contracting driving part 210 to be biased to the right side.

The contact tab unit 222 directly contacts the cooling block member 110 to serve to remove spatter attached to the cooling block member 110. To this end, the plurality of the contact tab portions 222 may be provided on the scraper body 221 to protrude at regular intervals.

Unevenness portions may be formed in the contact tab portion 222 to further increase the efficiency of removing the spatter.

That is, in the contact tab portion 222 of the foreign object removing device 1 according to an embodiment of the present disclosure, the unevenness portions, parallel to a direction intersecting the expansion and contraction direction of the rod member 211 are formed on a contact surface, in contact with one surface of the hood unit 100.

Since the unevenness portions 222*a* are formed in a direction, crossing the moving direction of the contact tab portion 222, which is a direction intersecting an expansion and contraction direction of the rod member 211, it may increase an area to be scraped while increasing pressing force upon contact with one surface of the cooling block member 110.

In other words, since the unevenness portions 222*a* are in line contact in a direction intersecting the moving direction of the contact tab portion 222, although a contact area is minimized and a region to be scraped by movement forms a surface region, thereby improving spatter removal efficiency.

The expansion and contraction driving unit 210 of the foreign object removing apparatus 1 according to an embodiment of the present disclosure may include a driving cylinder 212 fixedly coupled to one surface of the hood unit 100 and to which the rod member 211 is connected in an expansion and contraction manner, and a rod cleaner 213 coupled to the driving cylinder 212, and connected to pass through the rod member to remove foreign objects attached to the rod member 211.

As described above, one end portion of the expansion and contraction driving unit 210 is fixedly coupled to the hood unit, and the other end portion that is expanded and contracted is coupled to the scraper unit 220, thereby reciprocating the scraper unit 220, and in order to remove the spatter attached to the rod member 211 that is expanded and contracted, a rod cleaner 213 is further included.

Here, the driving cylinder 212 serves to provide driving force and drives the rod member 211 in an expansion and contraction manner. The driving cylinder 212 is coupled to one surface of the hood unit 100, and more specifically, is coupled to one surface of the cooling block member 110 of the hood unit 100.

The rod cleaner 213 serves to remove the spatter attached to the rod member 211. In other words, the rod member 211 may be attached to the spatter as it reciprocates in a region where the spatter occurs. In this case, if the spatter attached to the rod member 211 is not removed, the same problem as the above-described problem in which the spatter is attached to the hood unit 100 and falls after growth occurs. Therefore, in order to prevent this problem, the rod cleaner 213 is provided with a configuration for removing spatter attached to the rod member 211.

Such a rod cleaner 213 is fixedly coupled to the driving cylinder 212, and is configured to pass through the rod member 211 that reciprocates to remove foreign objects such as a spatter, or the like, attached to the rod member 211. Specifically, the rod cleaner 213 includes a support bar member 214 and a support block member 215.

That is, the rod cleaner 213 of the foreign object removing apparatus 1 according to an embodiment of the present disclosure may include a pair of support bar members 214 having one end portion coupled to the driving cylinder 212, and disposed adjacent to both sides of the rod member 211, and a support block member 215 coupled to the other end portion of the pair of support bar members 214, and having a through-hole 215a through which the rod member 211 that reciprocates, is formed.

Here, the support block member 215 has a through-hole 215a through which the rod member 211 passes, so that it substantially removes foreign objects such as spatter, or the like attached to the rod member 211.

More specifically, the support block member 215 is provided with a toothed portion 215b or a brush 215c to remove the spatter, or the like, and a detailed description thereof will be described later with reference to FIG. 5 or 6.

The support bar member 214 is a component that serves to fix and couple the support block member 215 to the driving cylinder 212, a pair of the support bar members may be disposed on both sides of the rod member 211, one end portion thereof of is coupled to the driving cylinder 212, the other end portion thereof is coupled to the support block member 215.

In addition, the rod cleaner 213 may further include a scrub member 216 in order to increase the efficiency of removing the spatter, and a detailed description thereof will be described later with reference to FIG. 7.

FIG. 5 is a perspective view illustrating an embodiment in which a support block member 215 includes a toothed portion 215b in the scraping unit 200 of the foreign object removing apparatus 1 of the present disclosure. Referring to FIG. 5, in the support block member 215 of the foreign object removing apparatus 1 according to an embodiment of the present disclosure, a toothed portion 215b, in contact with the rod member 211, is formed on an inner surface of the through-hole 215a.

That is, in order to increase an efficiency of removing foreign objects such as a spatter, or the like, attached to the rod member 211, the support block member 215 is formed to have a through-hole through which the rod member 211 passes, the toothed portion 215b may be formed on the inner surface of the through-hole 215a.

A plurality of toothed portions 215b may be formed in a form of unevenness portions 222a to be in close contact with the rod member 211 that reciprocates in the through-hole 215a, to remove foreign objects such as a spatter, or the like, horizontally with a reciprocating direction of the rod member 211, and the plurality of toothed portions 215b may also be formed in a form of the unevenness portions 222a, perpendicular to the reciprocating direction of the rod member 211.

FIG. 6 is a perspective view illustrating an embodiment in which a support block member 215 includes a brush 215c in a scraping unit 200 of the foreign object removing apparatus 1 of the present disclosure, and referring to FIG. 6, in the support block member 215 of the foreign object removing apparatus 1 according to an embodiment of the present disclosure, a brush 215c, in contact with the rod member 211, is formed on an inner surface of the through-hole 215a.

That is, in order to increase efficiency of removing foreign objects attached to the rod member 211 by forming a through-hole 215a through which the support block member 215 passes through the rod member 211, the brush 215c may be formed on the inner surface of the through-hole 215a.

The plurality of brushes 215c may be formed to be perpendicular to the inner surface of the through-hole 215a so as to be in close contact with the rod member 211 reciprocating to the through-hole 215a to remove foreign objects such as the spatter, or the like.

To this end, the brush 215c may be formed of a polymer material such as a metal material, plastic, or the like, but by adjusting a diameter of hair of the brush 215c, it may be configured to include flexibility, a degree enough to remove the attached spatter without damaging the rod member 211.

FIG. 7 is a perspective view illustrating an embodiment in which a scraping unit 200 of the foreign object removing apparatus 1 of the present disclosure includes a scrub member 216, and referring to FIG. 7, the rod cleaner 213 of the foreign object removing apparatus 1 according to an embodiment of the present disclosure may include an one end portion coupled to a portion of the support block member 215, adjacent to the through-hole 215a and the other end portion provided in a form of a trumpet, in contact with the rod member 211.

That is, the rod cleaner 213 may further include a scrub member 216 in order to increase efficiency of removing the spatter.

In other words, since the other end portion of the scrub member 216 is provided as a free end, not coupled to any configuration, and is configured to be provided in contact with an outer surface of the rod member 211 that reciprocates, and accordingly, the foreign object such as a spatter, or the like, attached to the rod member 211 is caught on the other end portion of the scrub member 216, such that the spatter, or the like attached to the rod member 211 may be eliminated from the rod member 211.

Moreover, since the scrub member 216 is formed to correspond to a diameter of the rod member 211 so that only the other end portion thereof is in contact with the outer surface of the rod member 211, and the scrub member 216 has a form of a trumpet of which a diameter becomes wider toward an end portion thereof, there is an advantage in that it does not affect a reciprocating movement of the rod member 211, and can only scratch and remove foreign objects such as the spatter, or the like, attached to the rod member 211.

While the present invention has been described with reference to exemplary embodiments in the present disclosure is not limited thereto, but various modifications may be made within the technical ideas of the present disclosure.

The invention claimed is:

1. A foreign object removing apparatus, comprising:
a hood unit configured to collect a foreign object generated from an electrical steel sheet by laser irradiation; and
a scraping unit coupled to the hood unit, and configured to scrape and remove the foreign object attached to one surface of the hood unit facing the electrical steel sheet,
wherein the scraping unit comprises:
an expansion and contraction driving unit coupled to the one surface of the hood unit facing the electrical steel sheet; and
a scraper unit coupled to an end portion of a rod member of the expansion and contraction driving unit, wherein the rod member is expandable and contractable, and the scraper unit is configured to reciprocate in close contact with the one surface of the hood unit facing the electrical steel sheet,
wherein the hood unit comprises:
a cooling block member disposed on the electrical steel sheet, the cooling block member including:
a slit hole through which the irradiated laser passes; and a cooling passage through which a cooling fluid flows and to which the scraping unit is coupled on the one surface of the hood unit facing the electrical steel sheet, and in order that the rod member is disposed away from the slit hole and the scraper unit is evenly disposed on the cooling block member, the rod member of the expansion and contraction driving unit is coupled to the scraper body of the scraper unit at a position adjacent to a side end portion of the cooling block member.

2. The foreign object removing apparatus of claim 1, wherein the scraper unit comprises:

a scraper body coupled to the rod member; and a plurality of contact tab units provided on the scraper body, and formed to protrude to contact the one surface of the hood unit facing the electrical steel sheet, the plurality of contact tab units being formed to be spaced apart from each other at predetermined intervals.

3. The foreign object removing apparatus of claim 2, wherein at least one of the plurality of contact tab units includes unevenness portions, in a direction intersecting an expansion and contraction direction of the rod member, the unevenness portions being in contact with the one surface of the hood unit facing the electrical steel sheet.

4. The foreign object removing apparatus of claim 1, wherein the expansion and contraction driving unit comprises:

a driving cylinder fixedly coupled to the one surface of the hood unit facing the electrical steel sheet, wherein the rod member is connected to the driving cylinder and is expandable and contractable; and a rod cleaner coupled to the driving cylinder, wherein the rod member is connected to pass through the rod cleaner to remove foreign objects attached to the rod member.

5. The foreign object removing apparatus of claim 4, wherein the rod cleaner comprises;

a pair of support bar members having one end portion coupled to the driving cylinder, and disposed adjacent to both sides of the rod member; and a support block member coupled to the other end portion of the pair of support bar members, and having a through-hole through which the rod member reciprocates.

6. The foreign object removing apparatus of claim 5, wherein the support block member includes a toothed portion that is in contact with the rod member and is disposed on an inner surface of the through-hole.

7. The foreign object removing apparatus of claim 5, wherein the support block member includes a brush that is in contact with the rod member and is disposed on an inner surface of the through-hole.

8. The foreign object removing apparatus of claim 5, wherein the rod cleaner comprises a scrub member having one end portion coupled to the support block member portion, adjacent to the through-hole and the other end portion provided in a form of a trumpet, in contact with the rod member.

9. The foreign object removing apparatus of claim 1, wherein the hood unit further comprises a dust collecting member coupled to the cooling block member to surround the cooling block member and collecting a foreign object generated from the electrical steel sheet, and wherein the cooling block member has a cooling passage through which a cooling fluid flows.

10. An electrical steel sheet manufacturing facility, comprising:

a laser room provided on a moving path of an electrical steel sheet;

a laser device provided inside the laser room, and forming a groove on a surface of the electrical steel sheet by irradiating a laser; and a foreign object removing apparatus according to claim 1 provided inside the laser room, and disposed between the electrical steel sheet and the laser device.

11. The foreign object removing apparatus of claim 1, wherein the position at which the rod member of the expansion and contraction driving unit is coupled to the scraper body of the scraper unit is closer to the side end portion of the cooling block member than to the slit hole of the cooling block member.

* * * * *